June 27, 1972   R. H. KELLER   3,672,860
GLASS GOB SHAPING AND DELIVERING MEANS
Original Filed July 9, 1968   3 Sheets-Sheet 2
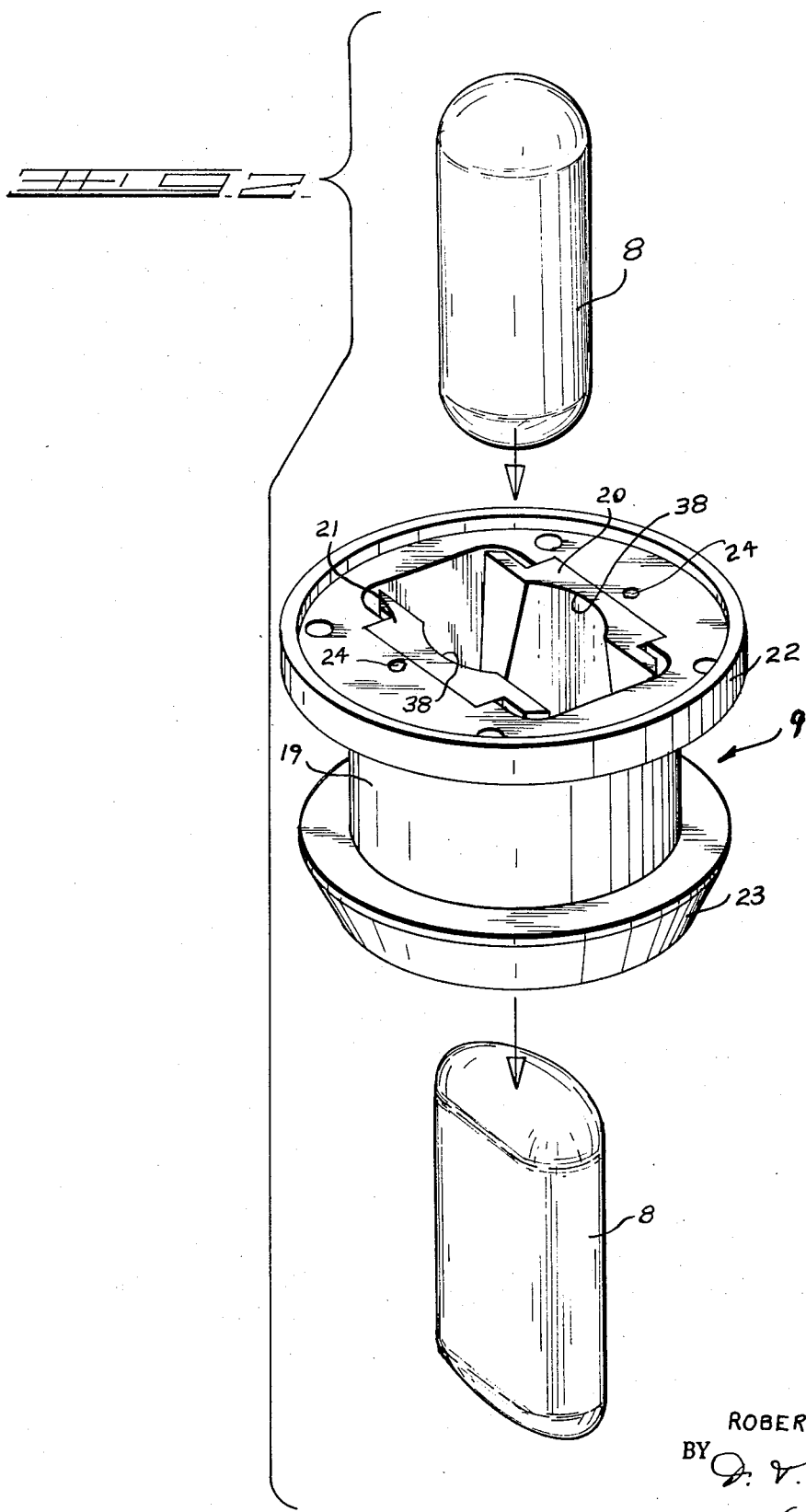
INVENTOR.
ROBERT H. KELLER
BY
W. A. Schaich
ATTYS.

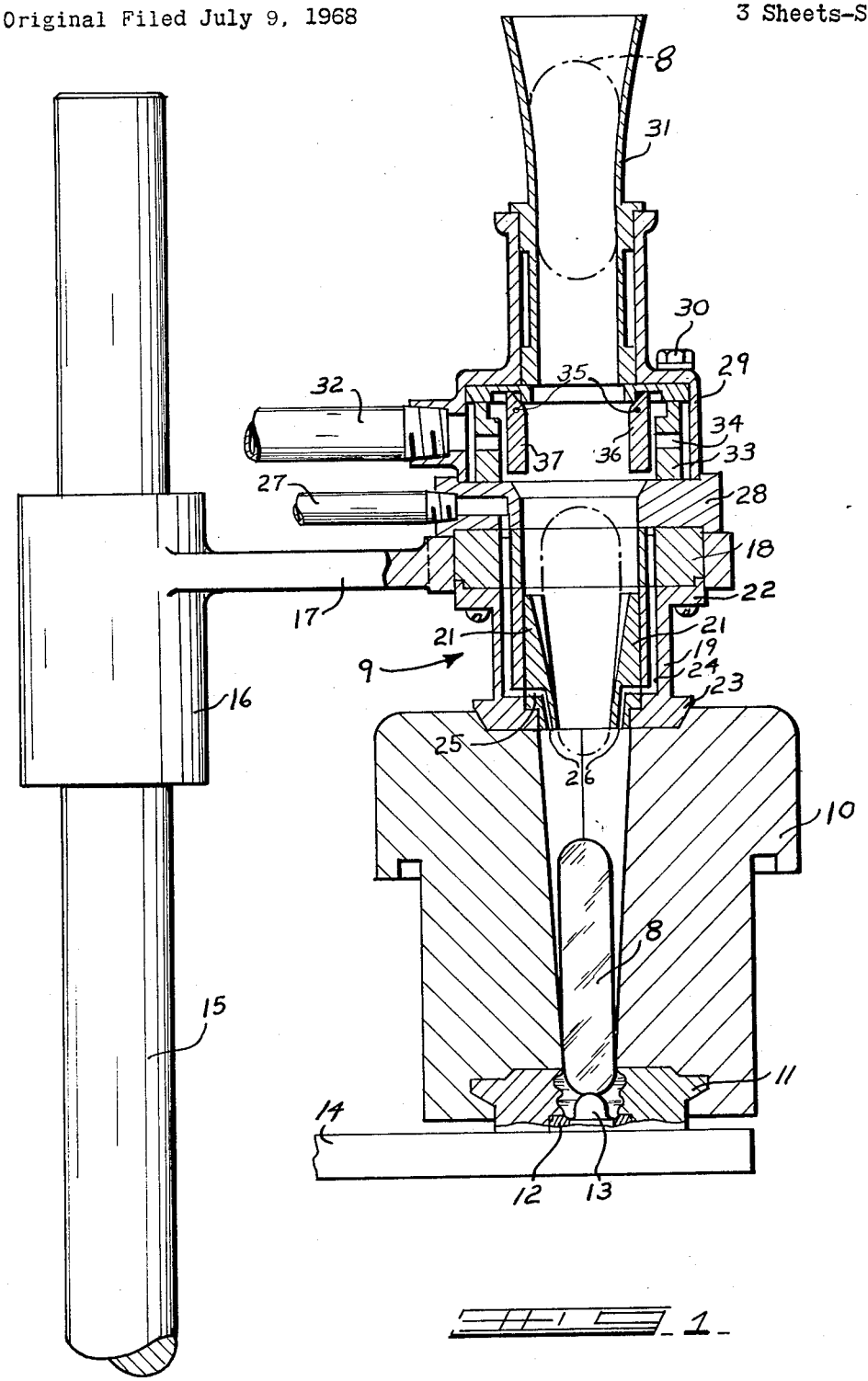

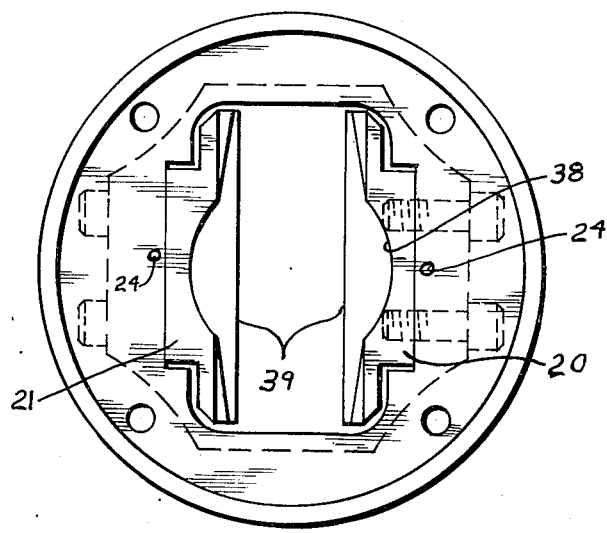
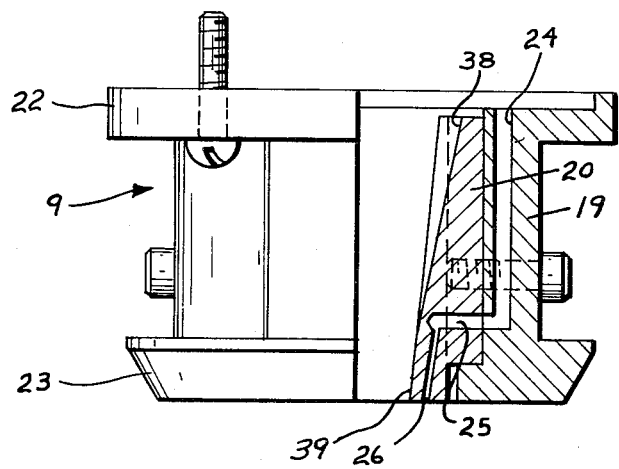

United States Patent Office 3,672,860
Patented June 27, 1972

3,672,860
GLASS GOB SHAPING AND DELIVERING MEANS
Robert H. Keller, Toledo, Ohio, assignor to
Owens-Illinois, Inc.
Continuation of application Ser. No. 743,373, July 9,
1968. This application Aug. 19, 1970, Ser. No. 65,239
Int. Cl. C03b 5/30, 39/00
U.S. Cl. 65—208                                   4 Claims

ABSTRACT OF THE DISCLOSURE

In the forming of narrow neck parisons by the process termed "blow and blow," the mold charges in the form of substantially cylindrical gobs are delivered to a gob centering guide positioned in alignment with the cavity of the parison mold. When the parison mold is of non-cylindrical cross-section, such as used in the formation of parisons which are to be expanded into flask-shaped containers having relatively flat sides, it is advantageous that the glass distribution in the parison be closely controlled. In order to form a better and more uniform parison, the present invention provides a shaping funnel portion positioned between the gob centering guide and the parison mold for pre-shaping the gob as it falls through the funnel into a generally oval cross-section, corresponding to the oval cross-section of the body portion of the parison mold cavity.

This application is a continuation of U.S. application Ser. No. 743,373 filed July 9, 1968, which application has been abandoned.

BACKGROUND OF THE INVENTION

This invention is directed to the guiding, preshaping and loading of mold charges or gobs into parison molds wherein the parison will have a non-cylindrical cross-sectional shape. When it is intended that the parison be formed into a non-circular container by the normal blowing process, in order to have good and even glass distribution throughout the container, it is necessary that the parison from which the bottle is to be formed also be generally uniform with respect to the counter-blown cavity formed therein. Since it is relatively impossible to feed mold charges or gobs in non-cylindrical cross-section, or at least it is difficult to form non-cylindrical mold charges at the feeder, which have predictable molding characteristics from a temperature distribution standpoint, it was found that the loading of cylindrical gobs into parison mold cavities of a non-circular cross-section was extremely difficult and critical. In the event the mold charge or gob were loaded non-centrally with respect to the mold cavity, glass distribution in the parison would be poor, resulting in a blown container which also would have poor wall thickness distribution.

Attempts have been made in the past to try to preshape gobs by designing specially-made funnel mechanisms of non-circular cross-section. These have been found to be extremely difficult to machine and extremely critical with respect to wear and size. Applicant has found that by making the pre-shaping mechanism of such a form that its glass contacting surfaces are of relatively simple, easily machined, replaceable wedge members, that economically the pre-shaping be carried out without the costly expense of hard-to-machine shapes.

With the foregoing in mind, applicant, by this invention, has devised apparatus which receives a cylindrical gob and pre-shapes the gob into a non-cylindrical or oval shape prior to loading of the charge or gob into the non-cylindrical parison mold. In this manner a superior parison may be formed.

SUMMARY OF THE INVENTION

This invention is directed to apparatus for guiding, pre-shaping and loading gobs of molten glass in parison molds in which the parison mold cavity is non-circular in cross-section and in which the mold charges are guided in the period of their movement just prior to entry into the parison mold so that they are assured of being loaded centrally of and symmetrical with respect to the vertical axis of the parison molds. Incorporated within the guiding mechanism, which is in registry with the mold, is a settle blow valve, lubricant spray arrangement and a pre-shaped funnel. The funnel, the settle blow valve and the gob guide all operate as a single unit, thus providing apparatus for loading in non-circular molds in such a fashion that superior parisons will be formed.

BRIEF DESCRIPTION OF THE DRAWINGS

FIG. 1 is an elevational view of the unitary gob loading, settle blow and pre-shaping apparatus of the invention, partly in section;

FIG. 2 is a perspective view of the pre-shaping funnel mechanism of the invention on an enlarged scale;

FIG. 3 is a top plan view of the pre-shaping funnel of FIG. 2; and

FIG. 4 is a side elevational view, partly in section, of the funnel mechanism of FIG. 3.

With reference to FIGS. 1–4, the details of the apparatus of the invention will be described in conjunction with a conventional parison forming mold of an I.S. type machine.

A conventional blank or parison mold 10 supported by the usual mechanism (not shown) is of the split or two-piece type which is closed about neck rings or neck molds 11. At the lower portion of the neck ring 11 there is provided a thimble 12 and centrally disposed within the thimble is a neck pin or plunger 13. The thimble 12 and neck pin 13 are separately supported while the neck ring 11 is carried by an invert arm 14 of a conventional I.S. forming machine. For reference purposes, U.S. Pat. 1,911,119 to Ingle illustrates the mechanical arrangements of the I.S. machine.

Adjacent the parison mold there is provided a vertically extending post 15 with a collar or sleeve 16 fixed thereto. The post 15 in normal operation is vertically shiftable and rotatable. The collar or sleeve 16 has formed integrally therewith a funnel arm 17 which serves as the raising and lowering mechanism with respect to the gob guiding settle blow valve and pre-shaping funnel mechanism to be described.

The arm 17 at its extending end is provided with a circular opening within which is seated a manifold ring 18. The manifold ring 18 has bolted to its undersurface, a funnel mechanism generally designated 9, which is made up of a pilot ring 19 within which a pair of pre-shaping wedge members 20 and 21 are positioned. The pilot ring 19 is formed with an upper annular mounting flange portion 22 and a lower piloting flange portion 23 which cooperates with the upper end of the parison mold in the area surrounding the mold cavity. The manifold ring 19 is provided with a pair of vertical passages 24. The lower end of the passages 24 extend at right angles inwardly of the ring 19 and are in alignment with complementary passages 25 formed in the wedges 20 and 21, with these passages in turn terminating at the lower edge of the wedges 20 and 21 in small openings 26 serving as spray nozzles for a mold lubricant.

Lubricant is supplied to the manifold ring 18 from a source (not shown) through a flexible pipe 27 connected to an opening in an annular base 28. The base 28 is mounted on the funnel arm in overlying relationship with respect to the manifold ring 18. The base 28 is provided with internal passages communicating with the passages in the manifold ring 18. Thus it can be seen that mold lubricant supplied through the pipe 27, under predetermined pressure, will spray the interior of the parison mold and the neck mold. The sequence of operation for introduction of the lubricant may be timed such that the spray will impinge on the outside of the gob as it falls out of the funnel mechanism 9.

The base 28 has a hollow cap 29 mounted thereon in axial alignment with the opening in the base 28. The cap is secured to the base by a series of crews 30. The upper portion of the cap is of somewhat smaller cross-section than the lower portion, with the upper portion serving as a support fo an annular gob guide 31.

Within the cap 29, a settle blow valve mechanism is provided. This settle blow valve is disclosed in detail in application Ser. No. 690,661 filed Dec. 14, 1967 by Robert D. Colchagoff. The cap 29 has a pipe 32 connected thereto through which air under pressure may be fed. Symmetrically located within the lower portion of the cap 29, and having an external diameter somewhat less than the internal diameter of the cap, is a frame 33. The frame 33 is provided with horizontal openings 34 through which air under pressure will be directed from the exterior of the frame to the interior thereof. The uppe edge of the frame 33 carries a pair of opposed, horizontal notches (not shown) which serve as bearings for hinge pins 35. The pins 35 are carried by a pair of opposed swing plates 36 and 37. The swing plates 36 and 37, in response to the introduction of fluid under pressure to the cap 29, will swing in an arc toward each other into juxtaposed position and, in effect, close off the lower end of the gob guide 31 while at the same time the air under pressure which is introduced, will be forced downwardly and serves as the settle blow pressure for settling the gob about the neck pin 13.

As can best be seen when viewing FIGS. 1 and 2, the mold charge or gob 8, as it arrives at the gob guide 31, is generally cylindrical in cross-section and as it drops from the guide through the settle blow valve mechanism, it still retains its substantially cylindrical appearance.

The wedges 20 and 21, as best shown in FIGS. 3 and 4, are bolted to the flat, opposing inner surfaces of the pilot ring 19. The upper edges of the wedges are provided with arcuate cut-out portions 38 in their facing surfaces. These cut-out portions 38 gradually merge, through-out the height of the wedges, with substantially opposed straight edges 39 at the lower end of the wedges. As previously described, the wedges are replacable which is desirable both from the standpoint of wear and tear and also from the standpoint of job changes. When other configurations or shapes are required for job changes, other wedges having different shapes or which, as pairs, form a gap therebetween which is of a different size, it is relatively easy to remove the wedges and replace them with other suitable wedges. The expense of having a large number or sets of permanent, integral wedge and pilot ring equipment for different job change requirements is obviated by the fact that the mechanism of the invention is such that the wedges are easily replaced and by the manner of their mounting in the pilot ring may be closely adjusted by the interpositioning of shims between the wedges and the pilot ring so that critical central loading can be achieved. Also, the wedges are much easier to machine to a precise contour.

As illustrated in FIG. 2, the gob 8 is generally cylindrical as it arrives above the pre-shaping funnel mechanism of the invention and after its exit therefrom, it will have a generally oval configuration with the gob perhaps somewhat longer than its original length. In this manner an oval mold charge or gob is provided for a complementary non-circular or oval parison mold cavity, with the gob being carefully guided into the mold so that it will be loaded symmetrical and on the precise center line of the mold cavity. Obviously, the orientation of the funnel mechanism is such as to ensure that the long axis of the cross-section of the gob coincides with the widest axis of the mold cavity.

While the specific apparatus disclosed relates to a single gob guiding and pre-shaping arrangement, it should be obvious that the invention has equal application to plural gob guiding and pre-shaping arrangements where the parison mold is of the plural cavity type and the loading of plural gobs simultaneously is provided.

Other and further modifications may be resorted to without departing from the spirit and scope of the appended claims.

I claim:

1. Apparatus for settle-blowing and shaping glass gobs in parison molds comprising, in combination a parison mold having an open upper end, said mold being non-cylindrical in cross-section, gob guiding means comprising a vertical guide and preshaping means interposed between said guide and said mold, said preshaping means conforming in cross-section to that of said mold, a valve chamber interposed between said guide and said preshaping means, normally open valve means in said valve chamber permitting gobs to fall therethrough by gravity, and means communicating with said valve chamber for introducing settle-blow air under pressure to said valve chamber below said valve means for closing said valve means, whereby flow of air to said guide is restricted and air under pressure is imposed on a gob to effect settle-blow of said gob in said parison mold.

2. The apparatus of claim 1, wherein said preshaping means funnel comprises an annular pilot ring having a pair of vertical, spaced-apart, inner surfaces, and a pair of replaceable wedges mounted to said pair of surfaces.

3. The apparatus of claim 2, wherein said wedges are formed with identically shaped facing surfaces, said facing surfaces having arcuate cut-outs at the upper ends thereof and tapering downwardly and inwardly toward each other to define opposed, straight edges at the bottom end thereof.

4. The apparatus of claim 3, wherein the spacing of the opposed facing arcuate cut-out surfaces of said wedges at the upper end are greater than the diameter of a gob of glass as delivered from the gob guide and the spacing at the lower end being substantially less than the gob diameter, whereby a gob passing through said funnel to the parison mold will be oval in cross-section.

References Cited
UNITED STATES PATENTS

| | | | |
|---|---|---|---|
| 1,756,493 | 4/1930 | Peiler | 65—26 |
| 1,853,002 | 4/1932 | Howard | 65—221 X |
| 2,010,334 | 8/1935 | Stewart | 65—330 X |
| 2,020,623 | 11/1935 | Stenhouse | 65—225 X |
| 3,141,752 | 7/1964 | Keller | 65—25 |
| 3,480,423 | 11/1969 | Lichok et al. | 65—25 X |

FRANK W. MIGA, Primary Examiner

U.S. Cl. X.R.

65—209, 221, 225, 303, 304, 24, 26, 71, 81